United States Patent
Sampath et al.

(10) Patent No.: US 9,569,556 B2
(45) Date of Patent: Feb. 14, 2017

(54) SOFTWARE ARCHITECTURE FOR DISPLAYING INFORMATION CONTENT FROM PLUG-IN MODULES IN A USER INTERFACE

(75) Inventors: Satish Sampath, Bangalore (IN); Steve Lawrence, Palo Alto, CA (US); Nikhil Bhatla, Walnut Creek, CA (US); Tomas Gunnarsson, Montreal (CA)

(73) Assignee: Google Inc., Mountain View, CA (US)

( * ) Notice: Subject to any disclaimer, the term of this patent is extended or adjusted under 35 U.S.C. 154(b) by 819 days.

(21) Appl. No.: 11/466,043

(22) Filed: Aug. 21, 2006

(65) Prior Publication Data

US 2007/0044086 A1 Feb. 22, 2007

Related U.S. Application Data

(60) Provisional application No. 60/709,653, filed on Aug. 19, 2005.

(51) Int. Cl.
| | | |
|---|---|---|
| G06F 17/30 | (2006.01) | |
| G06F 9/44 | (2006.01) | |
| G06F 9/445 | (2006.01) | |

(52) U.S. Cl.
CPC ........... *G06F 17/30899* (2013.01); *G06F 8/20* (2013.01); *G06F 9/44526* (2013.01)

(58) Field of Classification Search
CPC ....................................................... G06F 3/048
USPC .......................................... 715/826; 717/168
See application file for complete search history.

(56) References Cited

U.S. PATENT DOCUMENTS

| | | |
|---|---|---|
| 6,553,412 B1 | 4/2003 | Kloba et al. |
| 6,697,825 B1 | 2/2004 | Underwood et al. |
| 2001/0043346 A1* | 11/2001 | Roztocil et al. ............... 358/1.9 |
| 2003/0028534 A1* | 2/2003 | Crivella et al. ................. 707/10 |
| 2003/0222904 A1 | 12/2003 | Allor et al. |
| 2004/0267940 A1* | 12/2004 | Dideriksen et al. .......... 709/228 |
| 2005/0033794 A1* | 2/2005 | Aridor et al. ................. 709/200 |
| 2006/0015818 A1* | 1/2006 | Chaudhri et al. ............. 715/779 |

FOREIGN PATENT DOCUMENTS

| | | |
|---|---|---|
| JP | 6004253 | 1/1994 |
| JP | 9231037 (A) | 9/1997 |
| JP | 2003510717 A | 3/2003 |

(Continued)

OTHER PUBLICATIONS

PCT International Search Report and Written Opinion, PCT/US06/32653, Feb. 12, 2008, 10 pages.

(Continued)

*Primary Examiner* — Angie Badawi
(74) *Attorney, Agent, or Firm* — Fish & Richardson P.C.

(57) ABSTRACT

A user interface application, such as a sidebar application or web page, receives content from a set of plug-in modules. The user interface handles the display of the content and manages any user interaction with the content, thus abstracting these features from the plug-in modules. The plug-in modules may thus be device-independent and possibly used to display the same or corresponding content in other interfaces and/or other devices. One or more of the plug-in modules may also be designed to obtain and populate their content automatically based on user activity, including web browsing or interactions with documents on the local system.

24 Claims, 3 Drawing Sheets

(56) References Cited

FOREIGN PATENT DOCUMENTS

| JP | 2003513350 A | 4/2003 |
|---|---|---|
| JP | 2005020508 A | 1/2005 |
| JP | 2005085283 (A) | 3/2005 |

OTHER PUBLICATIONS

"Desktop Sidebar—FAQ," www.desktopsidebar.com/faq.html, [online] [Archived by http://web.archive.org on Mar. 14, 2005; Retrieved on Jun. 14, 2006] Retrieved from the Internet<URL:http://web.archive.org/web/20050314012749/www.desktopsidebar.com/faq.html>.

"Desktop Sidebar—Panels: Available Panels," www.desktopsidebar.com/panels.html, [online] [Archived by http://web.archive.org on Mar. 31, 2005; Retrieved on Jun. 14, 2006] Retrieved from the Internet<URL:http://web.archive.org/web/20050331055912/www.desktopsidebar.com/panels.html>.

"Desktop Sidebar Home Page: Welcome to Desktop Sidebar," www.desktopsidebar.com, [online] [Archived by http://web.archive.org on Mar. 31, 2005; Retrieved on Jun. 14, 2006] Retrieved from the Internet<URL:http://web.archive.org/web/20050331091138/http://www.desktopsidebar.com/>.

Supplementary European Search Report, European Patent Application No. EP06802030, Oct. 29, 2009, 9 Pages.

Anonymous: "The Incrementalist, Tiger Dashboard: First Impressions" www.retrovirus.com, May 2, 2005, 3 pages, [online] [retrieved on Oct. 15, 2009] Retrieved from the internet <URL:http://retrovirus.com/incr/2005/05/dashboard-first-impressions/>.

Gruber, J., "Dashboard vs. Konfabulator", www.daringfireball.net, Jun. 30, 2004, 8 pages, [online] [retrieved on Oct. 15, 2009] Retrieved from the internet <URL:http://daringfireball.net/2004/06/dashboard_vs_konfabulator>.

Peng, L., "Apple Worldwide Developer Conference Trip Report (Jun. 28-Jul. 2, 2004)" Lawrence Livermore National Lab (LLNL), Jul. 30, 2004, 22 pages, [online] [retrieved on Oct. 15, 2009] Retrieved from the internet <URL:http://macguild.org/wwdc/wwdc-2004.pdf>.

Siracusa, J., "Mac OS X 10.4 Tiger" www.arstechnica.com, Apr. 28, 2005, 4 pages, [online] [retrieved on Oct. 15, 2009] Retrieved from the internet <URL:http://arstechnica.com/apple/reviews/2005/04/macosx-10-4.ars/17>.

Surendorf, K., "Das Praxisbuch Mac OS X 10.4", Jul. 10, 2005, [online] [retrieved on Oct. 15, 2009] Retrieved from the internet <URL:http://www.galileodesign.de/download/dateien/807/galileodesign_mactiger_l04.pdf>. English summary can be retrieved at <URL:http://translate.googleusercontent.com/translate_c?hl=en&sl=de&u=http://mac.delta-c.de/node/415&prev=/search%3Fq%3DSURENDORF%2B-%2BDas%2BPraxisbuch%2BMac%2BOS%2BX%2B10.4%26hl%3Den&rurl=translate.google.com&usg=ALkJrhhdHFoRmkVGFFXDaUKIMTG3_EcwHA>.

Office Action for Canadian Patent Application No. CA 2,619,970, Nov. 4, 2010, 4 Pages.

Examiner's First Report on Australian Patent Application No. AU 2006280934, Sep. 23, 2010, 2 Pages.

Notice of Grounds for Rejection, Japanese Patent Application No. P2008-527213 mailed on Oct. 18, 2011, 4 pages.

First Office Action issued May 11, 2011 for Chinese Patent Application No. CN 200680037555.7, 34 Pages.

Examiner's second report on Australian Patent Application No. AU 2006280934, Feb. 15, 2012, 2 pages.

Notification of Second Office Action issued Feb. 15, 2012, for Chinese Patent Application No. CN 200680037555.7, 34 Pages.

Chinese Third Office Action, Chinese Application No. 200680037555.7, Aug. 17, 2012, 34 pages.

Notice of Grounds for Rejection for Japanese Patent Application No. JP P2008-527213, Jan. 8, 2013, 4 pages.

Communication pursuant to Article 94(3) EPC, Office Action for European Patent Application No. 06802030.4, Jun. 10, 2013, 6 Pages.

Office Action for Chinese Patent Application No. 200680037555.7, Jun. 3, 2013, 8 Pages.

* cited by examiner

SOFTWARE ARCHITECTURE FOR DISPLAYING INFORMATION CONTENT FROM PLUG-IN MODULES IN A USER INTERFACE

CROSS REFERENCE TO RELATED APPLICATIONS

This application claims the benefit of U.S. Provisional Application No. 60/709,653, filed Aug. 19, 2005, which is incorporated by reference in its entirety.

BACKGROUND

This disclosure relates generally to computer software, and in particular to a computer software architecture employing plug-in modules for displaying informational content in a user interface of one or more applications, such as a sidebar application.

A variety of software applications provide a user interface that allows users to accumulate, organize, and view content from a number of different sources. Such applications include sidebar applications, which run in a desktop environment and present content in the user interface. A user can typically customize the content in the sidebar as well as its formatting and other presentation attributes. Another type of user interface that allows users to customize content is a web page, such as a personalized home page, in which a user can select content from the Internet to display via a web browser. In this way, sidebar applications, personalized web pages, and other types of user interfaces can provide a more useful, tailored presentation of information that is relevant to each individual user.

The developers of these user interfaces allowing for the customization of content may not necessarily provide all, or any, of the content displayed on the user interface. In many cases, it may be desirable to allow third-party software developers to produce software modules that provide content for use with these applications. For example, a maker of a sidebar application may provide standard types of content with the sidebar application, such as the contents of the user's email inbox, the current performance metrics for the computer system, and a slideshow of pictures stored on the computer system. But to increase the utility of the sidebar application, the sidebar application may also accept content from "plug-in" modules made by the developer of the sidebar application or by third-party developers. For example, a provider of weather information on the Internet may produce a plug-in module that obtains selected weather information online and then presents that information through the sidebar's user interface. It can be appreciated that many other types of third-party content modules can be developed for many other useful purposes.

Plug-in architectures exist for sidebars and other types of user interfaces, where third-party content developers provide content using plug-in modules that interact with the main application. In this context, plug-in modules are software modules that obtain content and present the content to the user via the user interface of the main application. Existing plug-in architectures provide basic drawing commands and user input messages, which can be used by the software code of the plug-in module to manage the presentation of and interaction with the plug-in's content on the user interface. Because these plug-in modules manage the content display and the user interaction, the plug-ins are developed for a particular type of user interface and possibly for a particular target device. Accordingly, a plug-in developed for a sidebar application may not be suitable for providing content for other user interfaces, such as a web page, or other devices, such as a cellular phone running a WAP browser.

SUMMARY

A user interface for user-customizable content uses a plug-in architecture that allows one or more plug-in modules to provide content to the user interface. The user interface may be a sidebar, a web page, or any other suitable user interface that allows users to organize content from a variety of sources. The user interface handles the display of the content and manages user interaction with the content, thus abstracting these features from the plug-in modules. In this way, the plug-in modules may provide the content and possibly define user interactions allowed with the content without having to manage the display and user interaction with the content that occurs in the user interface. The plug-in modules may thus be device-independent and possibly used to display the same or corresponding content in other interfaces and/or other devices. The same plug-ins can then provide content to other types of interfaces that are developed to accept the content and manage the display and interaction with the content as appropriate for each interface and device on which the interface runs.

In one embodiment, a computer program product provides a user interface for user-customizable content. The product includes a set of plug-in modules, each of which provides a list of information items and possibly a definition of allowed user interactions with the information items. The product further includes a user interface module that displays panels for the plug-in modules so that each panel includes the information items from the corresponding plug-in module. The user interface module manages user interaction with the information items in the panels so that the plug-in modules do not have to. The user interface module may be designed for a sidebar, a web page, or any other user module that allows for the presentation of user-customizable content.

One or more of the plug-in modules may also be designed to obtain and populate their content automatically based on user activity, including web browsing or interactions with documents on the local system. This feature enables various applications in which a plug-in module can provide relevant content to a user with minimal manual customization by the user.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Plug-In Software Architecture

Figure 1:
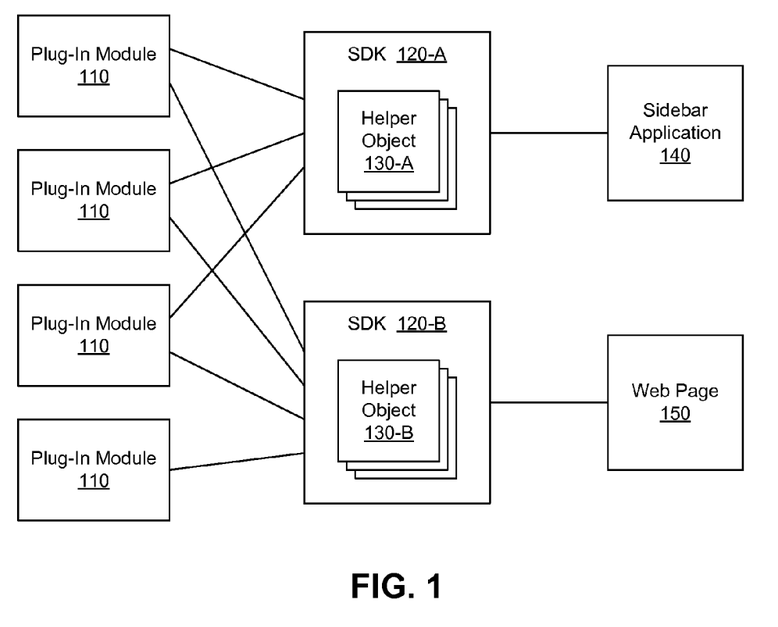
FIG. 1 is a schematic diagram of a software architecture for displaying content in a user interface from a set of plug-in modules, in accordance with an embodiment of the invention.

FIG. 1 illustrates a software architecture that is designed to facilitate the development of plug-in modules 110, such as those developed by third parties, for providing content to one or more different user interfaces. In the architecture shown in FIG. 1, the user interfaces include a sidebar application 140 and a web page 150; however, a variety of other types of user interfaces may be used in other embodiments of the invention. A sidebar application 140 and some types of web pages 150, such as personalized homepages, may be used to collect, organize, and present content from various sources. These sources include content stored on a local computer or attached storage and content obtainable via a network, such as the Internet. Although the user interfaces may have built-in capabilities to obtain content, they may also be enhanced by one or more plug-in modules 110 that are designed to provide content to the user interfaces.

In this context, a plug-in module 110 is a software module that provides content for one or more user interfaces. A plug-in module 110 may comprise programming code installed on a client computer and configured to provide content for a user interface of the client computer. As shown in FIG. 1, the plug-in modules 110 may provide content to one or to more than one user interface. This may be accomplished by simplifying the design of the plug-in modules 110 so that the drawing and user interaction management functionality is abstracted from the plug-in modules 110. Accordingly, in one embodiment, each plug-in module 110 simply defines the content, which may be expressed as a list or other set of one or more information items. The information items may comprise static text, hyperlinks, news articles, web clips, emails, files, applications, pictures, video, audio, and/or anything that can be presented via the user interface. In this way, plug-in modules 110 may be used to provide a wide variety of content to users via a particular user interface.

Each plug-in module 110 may further define the user interactions that are allowed with the information items. As can be appreciated, the allowed user interactions will likely depend on the types of content presented. For example, if the information items include links, an allowed user interaction may be a click on the link to open the content associated with the link. If the information item is an email, file, or application, a user interaction may be to open the corresponding email, file, or application. For video or audio, the user interaction may be to initiate and control the playback of the video or audio. Various other user interactions may be defined by the developer of each plug-in 110 to achieve other desired functionalities.

Because the plug-in 110 is not responsible for managing the drawing and user input functions in the user interface, other code is provided for these tasks. In one embodiment, the software architecture includes a software development kit (SDK) 120. The software development kit 120 may comprise programming code installed on the client computer and configured to receive content from the plug-in modules 110 and manage the display of and user interaction with that content on a user interface of the client computer.

In one embodiment, the software development kit 120 defines a software architecture that includes helper objects 130 that various plug-in modules 110 can use to provide content to the sidebar application. In one embodiment, the software development kit 120 includes one set of helper objects 130 for managing the drawing and presentation of the content on the user interface and another set of helper objects for managing the input handling and user interactions with the content. The helper objects 130 thus provide standardized graphics drawing and input handling functions so that developers of the plug-in modules 110 need not provide for those functions for each user interface with which the plug-in modules 110 may be used. This allows third parties to design plug-in modules 110 by focusing on the content and functionality instead of the design of each user interface.

In a general sense, the helper objects 130 may beneficially provide an easy way to add, remove, and/or manage content that is shown in a user interface. Where the content is in the form of a list of items, each item may be based on an existing template or on a totally new presentation format. Accordingly, the helper objects 130 may provide templates for commonly used content, such as email, news, files, and other types of content, while allowing developers the flexibility to present the content in other ways if desired. In various implementations, various helper objects 130 may be defined to perform a wide variety of functions.

In the embodiment of FIG. 1, the plug-in modules 110 provide content to multiple user interfaces, a sidebar application 140 and a web page 150. Because the user interfaces may present the content in different ways and may allow for different types of interaction with the content, they have different software development kits 120 with a different set of helper objects 130. Software development kit 120-A, for example, includes a set of helper objects 130-A that present content from a plug-in module 110 in a sidebar application 140. Software development kit 120-B, on the other hand, includes a set of helper objects 130-B that present content from a plug-in module 110 in a web page 150.

Preferably, the software development kits 120-A and 120-B include corresponding formats for defining content and user interactions. This helps facilitate the design of the plug-in modules 110. The plug-in modules 110 can then be developed once and would work with multiple user interfaces. Beneficially, this also allows the plug-in modules 110 to provide content for later-developed user interfaces. For example, if a new user interface is developed, a corresponding software development kit can be designed to receive content from the existing plug-in modules 110 and manage the presentation of and user interaction with that content for the new user interface.

Figure 2:
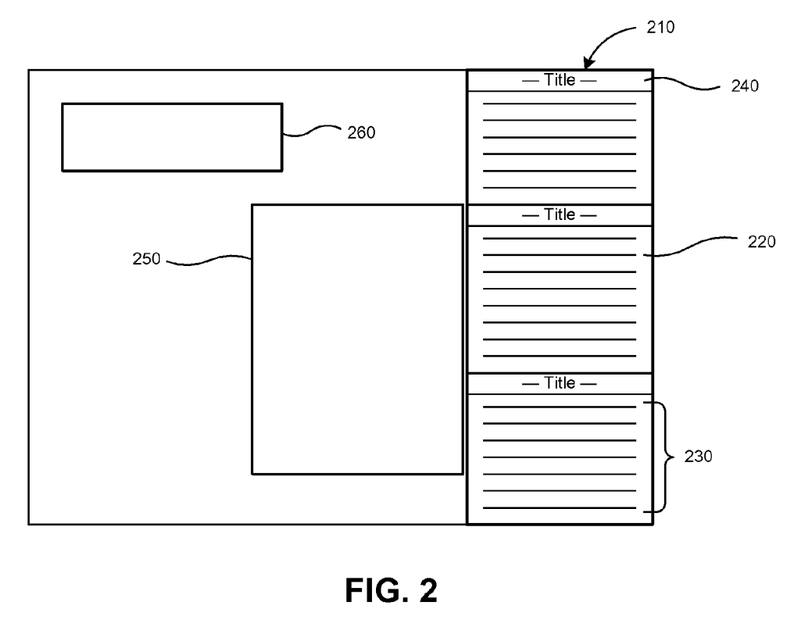
FIG. 2 is a sidebar user interface for a sidebar application, in accordance with an embodiment of the invention.
Figure 3:
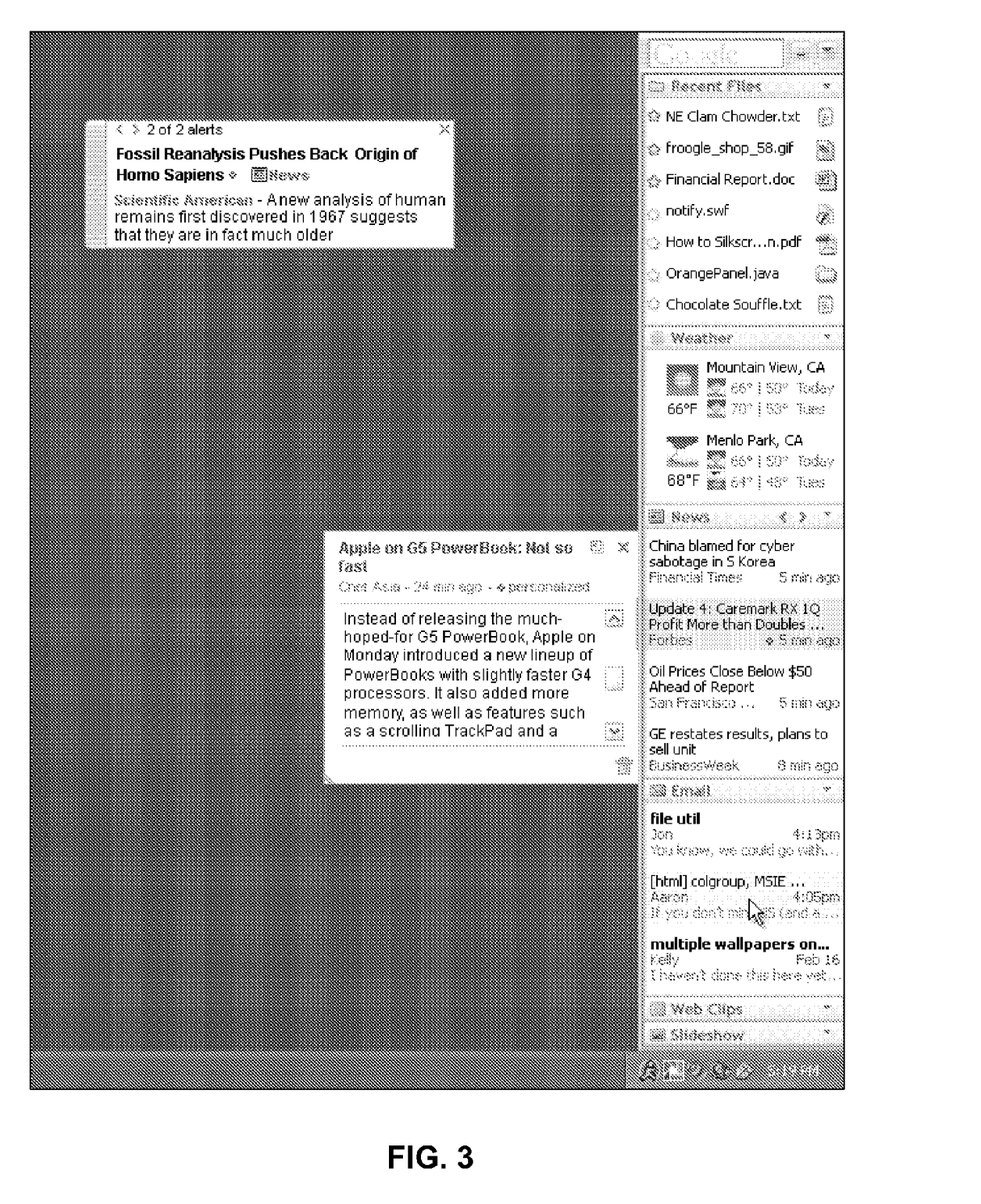
FIG. 3 is a screen shot of a sidebar, in accordance with an embodiment of the invention.

FIG. 2 illustrates the user interface for a sidebar application 140, in accordance with one embodiment of the invention. Software development kit 120-A presents the content from the plug-in modules 110 in a sidebar 210 in a display on a computer. The sidebar 210 contains a set of panels 220 in which the content of the plug-in modules 110 can be presented. In one embodiment, each panel 220 corresponds to a particular plug-in module 110. The panels 220 may include a title 240 and a list of information items 230, which may contain multiple items, contain a single item, or be empty. A panel 220 may show less than all of its information items 230 at a time. FIG. 3 is a screen shot of an example sidebar user interface.

A user may interact with panels 220 in the sidebar 210 in a variety of ways as the particular user interface allows. Many features of the user interface for a sidebar application are described in more detail below. In the embodiment shown in FIG. 2, a user may select an information item 230 in a panel 220 to pull up a details view 250 of that item 230. The details view 250 (described in more detail below) may show additional information about the item 230. For example, if the item is an article or an email, the details view 250 may show the entire article or email in a scrollable window. Other interactions are possible for other types of content. Another way in which the user may interact with the content is via a notification window 260, which may be shown upon a triggering event. For example, a plug-in module 110 may present the contents of an email inbox in a panel 220 and additionally provide newly received emails in the notification window 260. In one embodiment, the notification window may be configured to disappear automatically if not manually closed after a period of time.

Figure 4:
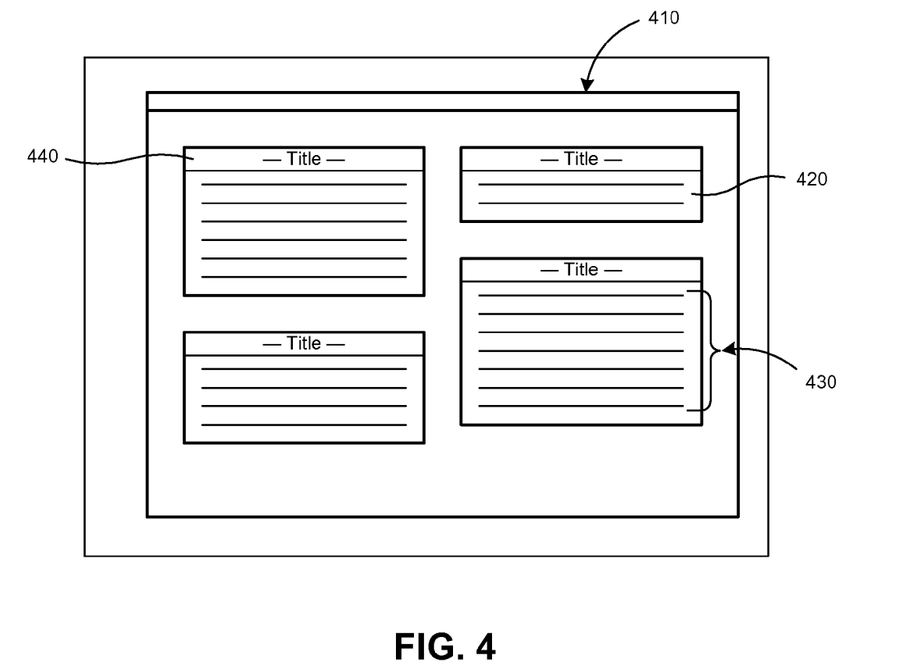
FIG. 4 is a user interface for a web page, in accordance with an embodiment of the invention.

The web page 150 may operate in the same fashion. FIG. 4 illustrates the user interface for a web page 150, in accordance with an embodiment of the invention. Software development kit 120-B presents the content from the plug-in modules 110 in an instance of a web page 410, for example, when viewed by a web browser. The software development kit 120-B displays the information items 430 in a panel 420 or other interface created for each plug-in module 110. As with the sidebar 210, the panels 420 in the web page 410 interface may include titles 440 corresponding to the plug-in modules 110 for each panel 420.

Because of their different natures, the sidebar 210 and the web page 410 user interfaces may present the content from the plug-in modules in different ways. Furthermore, their different capabilities may allow or disallow different user interactions with the content. Accordingly, the different software development kits 120-A and 120-B are designed to manage these presentation and user interactions correspondingly, so that the plug-in modules 110 need not be concerned with these functions. By selecting certain desired plug-in modules 110 and configuring the content that they present, a user can create customized content for the associated user interface. For one user interface, therefore, a user may select and configure a set of plug-in modules 110 and then have that customized content presented in other user interfaces. The other software development kits allow this customized content to be realized in the other corresponding user interfaces.

In one embodiment, multiple software development kits 120 are designed to display and manage user interaction with the content on user interfaces on different target devices, where each software development kits 120 is designed to run on a particular device and manage the content for a particular user interface. For example, one software development kit may be designed for a sidebar running on a computer system, while another software development kit may be designed for a user interface running on another target device such as a cellular phone or other portable device. The latter user interface may be, for example, a dedicated application running on the device or a page viewed by a WAP browser. In this way, a user's customized content can be accessed from a variety of target devices.

In operation, in one embodiment, a plug-in module 110 calls the helper objects 130 to add items 230 to a panel 220 so that the items are displayed to the user in the sidebar 210. When an item 230 is clicked or opened or if its details are viewed, the corresponding plug-in module 110 may receive a notification of this event from one of the input handling helper objects 130. In response to such an event, the plug-in module 110 may be programmed to provide certain information to display at that time or take another appropriate action, such as opening up a web page. But rather than containing the code to draw the items in a sidebar panel, the plug-in module 110 can simply pass the information and appropriate commands to the helper objects 130. The helper objects 130 then add the items to the panel 220 and draw them on the screen. In one embodiment, a plug-in module 110 can override the default behavior provided by the helper objects 130 and display the content in different ways by including in the plug-in module 110 specific code for drawing the content in the panel in a desired way in which the software development kit 120 is not pre-programmed to handle.

In one embodiment, a host and registration mechanism accepts registration information from plug-in modules 110 and loads them on the fly without requiring restarts or any extra action from the user. In this way, there is no need to enable the plug-in modules 110 manually from the user interface's options. Once a plug-in module 110 registers with the user interface (such as the sidebar application 140), it is automatically loaded onto the user interface, reducing user effort. This avoids restarts or asking users to select and enable a plug-in module 110 from the list of plug-in modules 110, and it reduces the effort from plug-in developers for registering their plug-in modules 110 in a user interface. After a successful registration with the user interface application, a component plug-in module 110 can then use the corresponding software development kit 120 to display its content and interact with the framework of the user interface.

This item-based approach of the user interface allows plug-in modules 110 to display their content easily and leaves the user interface interaction to the helper objects 130. This also allows the plug-in modules 110 to be oblivious to where that content is sent and displayed and how the user interacts with the content at the user interface level. The addition of templates to the item-based user interface enables reuse of functionality and less work for the plug-in developers. It also provides for a consistent user experience across all plug-in modules 110 and in all the output devices displaying the content. The user interfaces can thus provide content from a large number of sources in a more consistent way.

Sidebar Application

A sidebar application for a desktop environment acts as a host for plug-ins that provide useful visual information to the user in a convenient graphical user interface. FIG. 3 shows an example screen shot with a sidebar application docked at the right side of the desktop, in accordance with an embodiment of the invention. The sidebar may be moveable around the desktop as well as dockable at either side of the screen (or possibly in top and bottom edges).

One embodiment of the sidebar application allows a user to reorder the panels within the sidebar by clicking on a panel's title bar and dragging it to its desired location within the sidebar. While the panel is dragged, a transparent image of the panel follows the mouse cursor that represents the panel being moved. As the user moves the mouse around, the other panels in the sidebar will slide up and down to leave an open space where the panel will be inserted. Upon letting go of the mouse button, this transparent panel animates sliding into the open space, and the reordering is complete.

In another embodiment, a user can view a scrollable pop-out view of a particular panel displayed in the sidebar application. The scrollable pop-out view may allow a user to view a larger version of the panel. This larger pop-out view is preferably scrollable and allows viewing of all the items in the original panel. In one embodiment, the pop-out view includes the same information (i.e., the same list of items) as its corresponding panel, but the pop-out view allows the user to see more of it by virtue of the larger size and scrolling feature. If the panel displays only one item at a time, the expanded view may show a list of all the items in the panel. Otherwise, the pop-out view is the same view available in the panel with the exception that more information is displayed. This expanded pop-out view may be accessed in one embodiment by clicking a panel button or by clicking the panel title bar itself. The view is preferably resizable, and a scroll bar will appear if the amount of information exceeds that of the expanded display space. In one embodiment, the panel corresponding to a pop-out view is grayed out to indicate which panel has been popped out.

In another embodiment, the sidebar application provides a details view for a particular panel. A details view is similar to a pop-out view but gives additional information for a particular item in a panel. The details view of an item in the sidebar panel may thus allow the user to see more information about any given item in a panel. The additional information shown in the details view may take many forms depending on the type of item. For example, the details view may show the text of an email, an enlarged view of a photograph, or a forecast of the week's weather. From the details view, users may be able to access even more information by clicking on the title to open the item itself. The details view may be accessible by clicking on an item in the panel. Clicking again will close the view, as well as clicking on a close button in the view. The details view may open by sliding out to the side and close by sliding back underneath the sidebar. The details view may also provide the ability to perform selected defined actions to the corresponding item within the details view. A small gray bar over the item to which the details view corresponds may serve as a visual mark tying the details view to the specific highlighted item.

In another embodiment, a panel comprises a title bar and a body portion that includes the items in the panel. The title bar may contain an icon and a title that describe the panel, as well as various buttons that allow access to panel-specific features. This panel may be resizable to show more or less information and may also be minimized so that the only portion of the panel showing is its title bar.

In one embodiment, clicking on a panel's title bar toggles between a minimized mode and a normal mode for the panel. In normal mode, the panel's title bar shows the title of the panel and optionally a related icon, and the body portion shows the items in the panel. In a minimized mode, the normal body of the panel is hidden, and the items in the panel are displayed on the title bar instead of the title. In one embodiment, the information items contained in the panel rotate through, and are thus displayed sequentially in, the minimized title bar.

The sidebar application allows plug-in modules to display alerts to the user in a notification window that is separate from the sidebar and can be displayed even when the sidebar is hidden. For example, a notification window may pop up in response to certain events, such as receiving an email, the breaking of a news story, the expiration of a reminder or scheduled meeting, or any other of a number of events that can occur related to a panel on the sidebar. For each event, the notification window can display a title, a summary, and the source of the information in either visual or textual form. Beneficially, different plug-in modules can use the same notification window to display their alerts, so that a single interface can be used to provide alerts for content in the sidebar. As the alerts may relate to different items (such as emails, news, and the like), the alerts may have a visual indication of the alert's type, using for example an icon or other identifying graphic. Multiple items associated with a notification alert window can be viewed in the same notification window by navigating it, e.g., using arrow buttons. One embodiment of a notification window is shown in the upper left portion of the screen shot of FIG. 3.

The notification window may be moveable anywhere on the screen by clicking and dragging a handle or its title bar. In one embodiment, if multiple alerts exist, the alerts are shown one at a time in a slideshow style. A user can pause this slideshow by placing the mouse cursor over the notification window and can navigate forwards and backwards in the slideshow of alerts by clicking pagination buttons. Clicking on the notification display itself may open the item related to the event. For a new email alert, for example, clicking will open the email itself. If the user does not wish to see the notification display, they can click a close button, which will immediately close the notification user interface. In one embodiment, an alert is shown only if the information cannot be shown in the corresponding sidebar panel, e.g., if the sidebar is minimized. This feature may be an option settable by the user.

Automatic Population of Plug-In Content

In one embodiment, a plug-in module observes a user's behavior and analyzes the content being accessed by the user. This content may be information in a web page being viewed in a browser, the contents of a document that is opened in an application, or any other content that a user may be using on the computer. Depending on the purpose of the plug-in, the plug-in identifies particular relevant types of information within that content—if such information exists therein—for use in the panels (e.g., images or addresses). Alternatively, the plug-in may analyze information used by or actions taken by the user, which indirectly point to content. For example, the plug-in module may recognize that a user accesses a URL that contains a RSS feed, and in response the plug-in module can pull text and/or images from that RSS feed.

It can be appreciated that a great many applications are enabled with embodiments of the type of plug-in module described herein. In one example, a plug-in module reviews the contents of web pages, emails, and/or other documents as they are viewed by a user in a browser, automatically detecting any addresses therein. The plug-in module may be notified of a new web page or email view by a crawler. If an address is detected, the plug-in module retrieves a map of the address and preloads that map information in a corresponding panel in the sidebar or other user interface. The resulting map image in the panel may be clickable to bring up a fully-functional maps window. As new addresses are identified, the plug-in module preloads its map information and queues that to be the next map that shows in the panel.

In one embodiment, the ability to browse to the original item is preserved. For example, the user may be able to browse to an original image from a slideshow (e.g., where the panel shows images from an RSS feed of a currently viewed web site) or to the website from which the pictures came.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

Some portions of above description describe the invention in terms of algorithms and symbolic representations of operations on information. These algorithmic descriptions and representations are the means used by those skilled in the data processing arts to most effectively convey the substance of their work to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer program product providing a user interface for user customizable content, the computer program product comprising a computer-readable medium containing computer program code comprising:
    a plug-in module configured to provide informational content received from a content source for presentation on a plurality of user interfaces and adapted to provide a list of information items representing the content, wherein the plug-in module is device-independent and configured to register with a user interface for automatic loading by the user interface, the plug-in module further configured to define one or more user interactions allowed with the information items, each user interface configured to present the list of information items and allow the defined user interactions with the information items, different user interfaces configured to present the list of information items in different ways;
    a first software development kit configured to receive the information items and the one or more user interactions from the plug-in module, present the information items on a first user interface and to manage the one or more user interactions with the information items in the first user interface, wherein the presentation of the information items and user interactions are managed by a first set of helper objects comprising instructions within the first software development kit; and
    a second software development kit configured to receive the information items and the one or more user interactions from the plug-in module, present the information items on a second user interface and to manage the one or more user interactions with the information items in the second user interface, wherein the presentation of the information items and user interactions are managed by a second set of helper objects comprising instructions within the second software development kit.

2. The computer program product of claim 1, wherein the user interface is configured to manage the user interaction with the information items according to the allowed user interactions defined by the plug-in module.

3. The computer program product of claim 1, wherein each software development kit is configured to present the information items in a panel corresponding to the plug-in module.

4. The computer program product of claim 1, wherein each software development kit is configured to present the information items in a sidebar on a computer desktop.

5. The computer program product of claim 1, wherein each software development kit is configured to present the information items in a user-customized homepage.

6. The computer program product of claim 1, wherein the plug-in module is configured to obtain a list of information items at least in part by observing a user's behavior and identifying information items based on the user's behavior.

7. The computer program product of claim 1, wherein the first software development kit presents the information items and manages user interactions with the information items via the first user interface without invoking instructions from the plug-in module and the second software development kit presents the information items and manages user interactions with the information items via the second user interface without invoking instructions of the plug-in module.

8. A computer program product providing a user interface for user-customizable content, the computer program product comprising a computer-readable medium containing computer program code comprising:
a plug-in module configured to provide content from a content source for presentation on a plurality of user interfaces and adapted to provide a list of information items representing the content, wherein the plug-in module is device-independent and configured to register with a user interface for automatic loading by the user interface, the plug-in module further configured to define one or more user interactions allowed with the information items; and
a plurality of software development kits, each software development kit configured to receive the information items and the one or more user interactions from the plug-in module, present the information items from the plug-in module on a user interface and to manage user interaction with the information items in the user interface, wherein the presentation of the information items and user interactions are managed by instructions within the software development kit.

9. The computer program product of claim 8, wherein the user interface is a sidebar application.

10. The computer program product of claim 8, wherein the user interface is a web page.

11. The computer program product of claim 8, wherein each user interface is adapted to run on a different target device.

12. A computer program product for providing a user interface for displaying content from one or more plug-in modules, the computer program product comprising a computer-readable medium containing computer program code configured to:
receive a set of information items from a plug-in module configured to provide a list of information items representing content from a content source for presentation on a plurality of user interfaces, wherein the plug-in module is device-independent and configured to register with a user interface for automatic loading by the user interface, the plug-in module further configured to define one or more user interactions allowed with the information items, the presentation of and user interactions with the information items in each user interface managed by a corresponding software development kit;
receive the one or more user interactions allowed with the information items from the plug-in module; and
manage, by a software development kit, the presentation of and user interactions with the information items in a user interface, wherein the presentation of the information items and user interactions are managed by a set of helper objects comprising instructions within the software development kit.

13. The computer program product of claim 12, wherein the plug-in module defines a set of allowed user interactions for one or more of the information items.

14. The computer program product of claim 12, wherein the user interface is a sidebar application.

15. The computer program product of claim 12, wherein the user interface is a web site.

16. The computer program product of claim 12, wherein the computer program code is further configured to:
create a panel on the user interface for each plug-in module, each panel including the information items for the plug-in module.

17. The computer program product of claim 12, wherein the plug-in module is configured to obtain a list of information items at least in part by observing a user's behavior and identifying relevant information items based on the user's behavior.

18. The computer program product of claim 12, wherein the software development kit presents the information items and manages user interactions with the information items via the user interface without invoking instructions of the plug-in module.

19. A computer program product for providing a use interface to user-customizable content, the computer program product comprising a computer-readable medium containing computer program code comprising:
a set of plug-in modules, a plug-in module configured to provide a list of information items and to define allowed user interactions with the information items on a plurality of user interfaces, wherein the plug-in module is device-independent and configured to register with a user interface for automatic loading by the user interface, the plug-in module further configured to define one or more user interactions allowed with the information items, wherein the presentation of and user interactions with the information items in each user interface is managed by a corresponding software development kit; and
a sidebar kit configured to receive the lists of information items and allowed user interactions from the plug-in modules, wherein presentation of the information items and the user interactions with the information items are managed by instructions within the sidebar kit and the sidebar kit comprises a first set of helper objects for displaying the information items from each plug-in module in a panel of a sidebar, and a second set of helper objects for managing user interactions with the information items according to the defined allowed user interactions.

20. The computer program product of claim 19, further comprising:
a web page kit configured to receive the lists of information items and allowed user interactions from the plug-in modules, the web page kit comprising a first set of helper objects for displaying the information items from each plug-in module in a panel of a web page, and a second set of helper objects for managing user interactions with the information items according to the defined allowed user interactions.

21. The computer program product of claim 19, further comprising:
a software development kit configured to receive the lists of information items and allowed user interactions from the plug-in modules, the software development kit configured to display the information items and manage user interaction therewith on a target device other than a computer system.

22. The computer program product of claim 19, wherein at least one of the plug-in modules is configured to obtain a list of information items at least in part by observing a user's behavior and identifying relevant information items based on the user's behavior.

23. A computer-implemented method for obtaining information items by a plug-in module for a user interface, the method comprising:

observing, by a local machine, a user's behavior on the local machine, the behavior comprising viewing of documents on the local machine;

analyzing, by the local machine, documents being accessed by the user;

identifying, by the local machine, one or more information items from the documents being accessed by the user;

adding, by the local machine, the identified information as one or more new information items for the plug-in module, wherein the plug-in module is device-independent and configured to register with a user interface for automatic loading by the user interface, the plug-in module configured to provide a list of information items and define allowed user interactions with the information items on a plurality of user interfaces, the presentation of the information items and allowed user interactions with the information items in each user interface managed by a corresponding software development kit, different user interfaces configured to present the list of information items in different ways; and providing the information items and the allowed user interactions associated with the plug-in module to the user interface, wherein the presentation of the information items in the user interface and user interactions with the information items are managed by a set of helper objects comprising instructions within a software development kit of the user interface.

24. The computer-implemented method of claim 23, wherein an information item identified from the documents accessed by the user comprises an address, the plug-in module configured to retrieve a map of the address and preload the map for display via the user interface.

* * * * *

UNITED STATES PATENT AND TRADEMARK OFFICE
CERTIFICATE OF CORRECTION

PATENT NO.        : 9,569,556 B2
APPLICATION NO.   : 11/466043
DATED             : February 14, 2017
INVENTOR(S)       : Sampath et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 910 days.

Signed and Sealed this
Twenty-fifth Day of September, 2018

Andrei Iancu
*Director of the United States Patent and Trademark Office*